June 21, 1966  O. JACHE  3,257,237
LEAD ACID TYPE STORAGE BATTERY
Original Filed Jan. 27, 1961  2 Sheets-Sheet 1
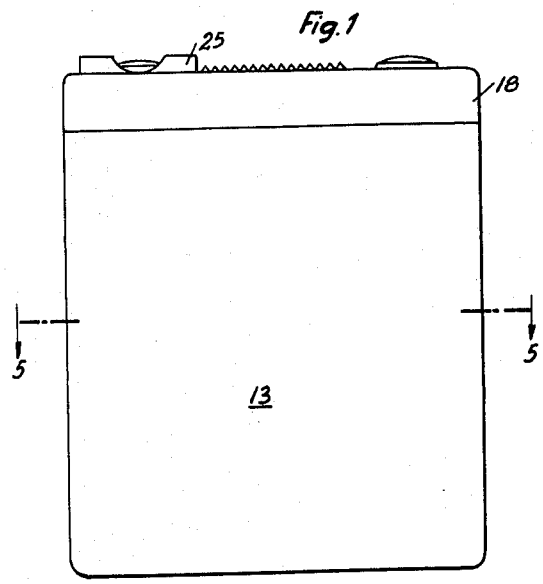
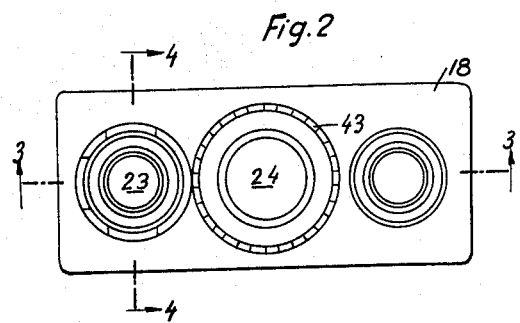
Inventor:
Otto Jache
By: [signature]
ATTORNEY

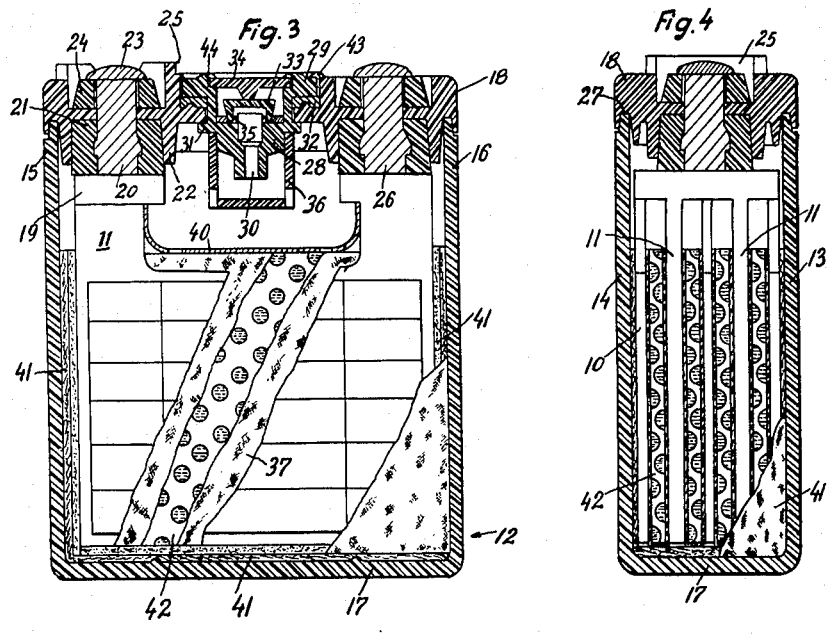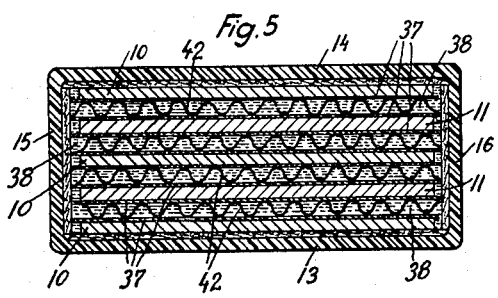

United States Patent Office 3,257,237
Patented June 21, 1966

3,257,237
LEAD ACID TYPE STORAGE BATTERY
Otto Jache, Budingen, Germany, assignor to Accumulatorenfabrik Sonnenschein G.m.b.H., Budingen, Oberhessen, Germany, a limited-liability company of Germany
Continuation of application Ser. No. 85,415, Jan. 27, 1961, now Patent No. 3,172,782, dated Mar. 9, 1965. This application Mar. 4, 1965, Ser. No. 437,229
6 Claims. (Cl. 136—6)

This is a continuation of application Serial No. 85,415, filed January 27, 1961, now United States Patent No. 3,172,782.

My invention relates to a storage battery of the lead-acid type. It is the primary object of my invention to provide a storage battery of this type which is capable of operation in any position, its housing being normally sealed so as to prevent leakage.

Further objects are to provide an improved battery of this type with a minimum of self-discharge and with a maximum lifetime permitting the battery to be repeatedly re-charged many times after discharge with a minimum loss of capacity; to provide improved means for immobilizing the electrolyte between the electrodes without impairing the permanency of its electrical contact with the electrodes; to provide the storage battery with an electrolyte formed by a gel of great stability which will not deteriorate owing to ageing to a substantial degree; and to equip such storage battery with means for periodically and temporarily liquifying the gel in the immediate vicinity of the electrodes for the purpose of re-generating the intimate contact between the gel and the electrodes.

Further objects of my invention will appear from a detailed description of a preferred embodiment thereof with reference to the accompanying drawings. It is to be understood, however, that my invention is in no way limited to such details but is capable of numerous modifications within the scope of the appended claims and that the terms and phrases used in such detailed description have been chosen for the purpose of expaining rather than that of restricting or limiting the invention.

In the drawings
FIG. 1 is an elevation of a storage battery representing a preferred embodiment of my invention,
FIG. 2 is a plan view of the battery shown in FIG. 1,
FIG. 3 is a vertical section taken through the battery shown in FIGS. 1 and 2, the section being taken along the line 3—3 of FIG. 2,
FIG. 4 is a section of the battery shown in FIGS. 1, 2 and 3, the section being taken along the line 4—4 of FIG. 2, and
FIG. 5 is a horizontal section taken through the battery shown in FIGS. 1-4, the section being taken along the line 5—5 shown in FIG. 1.

The storage battery of the lead-acid type shown in the drawings comprises a plurality of spaced flat plates 10 constituting the negative electrodes, a plurality of flat plates 11 interleaved between and disposed in spaced relationship to the negative electrodes 10 and constituting the positive electrodes 11 and an acid electrolyte. The plates 10 and 11 are formed by grids consisting of a suitable lead alloy and by a porous active material filling the interstices of the grids.

The electrodes are mounted within a rectangular housing 12 having a front wall 13, a rear wall 14 parallel thereto, parallel side walls 15 and 16, a bottom wall 17 integral with the walls 13–16 and a cover 18 fixed to the housing in a suitable manner. The positive electrodes 11 are connected by a horizontal bridge member 19 integral with projections thereof and with a pole member 20 which extends through a hole provided in the cover 18 and is fixed to the cover in the conventional manner. For that purpose, the pole member has a peripheral head and is embedded within an annular member 21 of a suitable plastic firmly seated on the inner face of the cover and on the inside of an annular flange 22 moulded thereon. The pole member 20 projects above the cover 18 and is provided with a head 23 resting on and soldered to an annular lead member 24 placed on the top of cover 18 and surrounding the pole member 20 and being itself surrounded by a recessed protective annular member 25. The cables to be connected with the storage battery are provided with terminal members adapted to establish an electrical contact with the pole heads, such as 23, and it is the purpose of the protective annular member 25 to prevent the attachment of the negative terminal member and to permit attachment of the positive terminal member only.

The negative electrodes 10 are likewise connected by and integral with a horizontal bridge member which is similar to member 19 and is integral with a pole member 26 which is shaped and mounted similarly as pole member 20 so that a detailed description of such mounting may be dispensed with. It may be mentioned, however, that the negative pole member 26 is not surrounded by a protective annular member, such as 25.

The bottom face of the cover 18 is provided with a circumferential groove 27 engaging over the upper edge of the housing walls 13–16 in a sealed manner. The central portion of the cover 18 is provided with an aperture, and a spring-loaded pressure relief valve is mounted on the cover 18 to close the aperture but to open outwardly under the effect of excessive internal pressure that might develop within the housing owing to the development of gases produced in the charging operation.

The pressure relief valve comprises a substantially cup-shaped valve body 28 having an external upper flange 29 and a bottom provided with a central valve passage-way 30 and with a peripheral flange 31 which underlies the cover 18 and constitutes bayonet locking means for securement of the valve body in the cover 18. For that purpose, the flange 31 is provided with a plurality of circumferentially distributed spaced recesses and the edge of the central aperture of the cover is likewise provided with a plurality of circumferentially distributed spaced recesses so that the valve body may be inserted from the outside through the aperture, after the sections of the flange 31 have been brought into registry with the recesses in the edge of the aperture. After the body has been so inserted into the opening it may be turned to thereby bring the sections of flange 31 out of registry with the recesses of the cover 18.

Preferably, the cover is provided with an annular bead surrounding its central aperture and engaging a seal ring 32 interposed between the flange 29 and the cover 18 and consisting of a suitable elastomer material which is compressed, when the valve body is inserted in the cover to thereby provide a tight seal.

The upper mouth of the passage-way 30 is surrounded by an upstanding lip provided upon the bottom of the cup-shaped valve body 28 and this bottom constitutes a valve seat for cooperation with the edge of a valve member 33 of inverted cup-shape yieldingly held in closed position by a lower central projection of a horizontal plate 34 which is carried by the cup-shaped valve body 28 and engages an inner peripheral groove provided at the top thereof. Preferably, the valve member 33 and/or the plate 34 consists of an elastic material which will yield, when excessive pressure acts upon the bottom side of the valve member 33 permitting same to rise sufficiently to relieve such pressure by escape of the gases through vents (not shown) in the plate 34. Since the plate 34 consists of an elastic yielding material it represents a spring which holds valve member 33 in closed position until the valve member is opened by excessive pressure. In other words, valve member 33 is a spring-loaded relief valve.

Preferably, the valve seat formed by the top surface of the bottom of the cup-shaped valve body 28 is covered by a suitable deformable sealing medium of liquid or paste-like consistency and preferably consisting of a hydrophobe material, such as silicon oil or grease. This sealing medium which is indicated at 35 is prevented by the lip surrounding the upper mouth of the passage-way 30 from escaping through the latter.

A protective cage 36 surrounds the inwardly projecting portion of the valve body 28 and is suitably fixed thereto.

The opposed faces of the electrodes 10 and 11 are covered by layers 37 of a suitable porous fibrous material. These layers are held in spaced relationship from each other by spacers so as to confine pockets between each other. In the embodiment shown each spacer is formed by a corrugated and perforated thin sheet 42 preferably consisting of a suitable plastic, the corrugations extending parallel to the walls 13–16 as will appear from FIG. 5.

An acid electrolyte fills the space between the electrodes 10 and 11 including the pockets 38 and including the pores of the fibrous layers 37. This electrolyte is formed by a thixotropic hydrogel constituting a colloidal solution of an additive in a diluted acid.

This additive is formed by a finely dispersed material which while insoluble in the diluted acid is capable of forming a colloidal solution therewith which constitutes a thixotropic hydrogel, i.e. a gel which, when agitated, becomes liquid and congeals again after the agitation has ceased.

Preferably, an oxide insoluble in sulphuric acid, such as silica or alumina, may be used as the gel-forming additive. The particles of this finely dispersed material should have an average size of less than .1 micron and preferably between .01 and .02 micron. These small particles of silica or alumina, added to the electrolyte, immobilize the electrolyte within the battery owing to their ability to agglomerate thereby converting it into a hydrogel of a surprising stability. The particle size of the additive should be limited to a maximum of .1 micron which, while sufficient to form the thixotropic hydrogel within the space between the electrodes 10 and 11, will not form the gel within the pores of the active material of the electrodes 10 and 11, as it is desirable that the pores of the active material be filled by the liquid phase of the colloidal solution only. This will be enhanced by using a porous active material having an average size of its pores which is substantially smaller than the colloidal agglomerations so as to substantially prevent a sulphuric acid within the pores from forming a hydrogel.

This hydrogel produces the surprising effect that the gel-forming agglomerations even if their concentration in the electrolyte is insufficient to form a coherent stable gel are too big to be able to enter into the pores of the active material even though the average size of its pores amounts at any rate to more than $.1\mu$ and preferably amounts to between .5 and $2\mu$. Owing to this effect, the electrolyte only which is outside of the pores of the electrodes will be converted into a gel, whereas the electrolyte within the pores of the active material will remain liquid and freely movable.

Where the additive is formed by a finely dispersed silica having a particle size of .01–.02 micron, the quantity of the additive may amount to 3–10 percent by weight, preferably to about 6 percent by weight, of the electrolyte. A quantity of the additive smaller than 3% results in a colloidal solution which takes an unduly extended time to form a coherent hydrogel, whereas a quantity of the additive exceeding 10 percent by weight of the electrolyte results in a gel subject to excessive ageing and liable to reduce the volume of the electrolyte to an objectionable degree.

The porous material of which the layers 37 consist is preferably a fleece of glass fibres having an average diameter of 15 micron and being spaced a distance of 150 micron per average. The fleece, however, may contain thinner fibers of a diameter down to 10 micron or thicker fibers having a diameter up to 20 micron. It is desirable, however, that the spacing of the individual fibers determining the size of the pores of the fleece amounts to between 100 and 200 micron.

If desired, however, the porous fibrous material forming the layers 37 may be a woven or knitted material.

The pocket which is formed by a pair of layers 37 and includes a corrugated spacer 42 may be closed at the sides and at the bottom but may be open at its top. In this event, the battery is provided with a substantially rigid sheet 40 interposed between the horizontal bridge members, such as 19, and extending from the end wall 15 to the end wall 16 of the housing and across the open tops of the pockets to close the latter. This sheet 40 which may consist of a suitable plastic, is preferably perforated so as to permit passage of the diluted sulphuric acid, when the same is poured into the housing through the aperture of the cover 18 after removal of the valve body 36.

Each pocket may be closed along its lateral margins and its lower margin by stitches connecting the edges of the opposed fibrous layers. Alternatively, however, additional fibrous sheets 41 consisting of the same or of a similar material as the layers 37 may cover the internal faces of the walls 13–17 and may contact the edges of the electrode plates 10 and 11 and the edges of the layers 37 to thereby close the pockets at the sides and at the bottom.

The corrugated spacers 42 subdivide the body formed by the gel in each pocket into a plurality of columnar portions communicating with each other through the perforations of the spacer sheet. In this manner, the spacer sheet will contribute to the stability of the gel.

The valve body 36 may be secured against accidental rotation and removal by a circumferential welding seam as indicated at 43. As shown in FIG. 3, flange 29 is located within a recess provided in the top surface of cover 18. The welding seam 43 connects the upper edge of flange 29 with the edge of this recess and can be applied after the valve body 28 has been inserted in the cover 18. In a similar manner, the plate 34 may be held in position at the top of the body 28 by a welding seam 44.

Having now described a preferred embodiment of my improved storage battery, I shall now explain my novel method of re-charging the storage battery.

When the charging current is being conducted through the electrodes 10 and 11 and through the electrolyte therebetween, the current will eventually cause gases to be developed in the active material forming part of the positive electrodes 11. This will happen when the charging operation is substantially completed. Now I have found that particularly favorable results are obtained if the current-conducting operation is discontinued immediately, when the gas developed in the pores of the active electrode material has expelled a substantial quantity of the liquid phase of the colloidal solution therefrom. The expelled liquid causes agitation of the gel in immediate vicinity of the electrodes and, due to the thixotropic properties of the gel, it will be liquified by such agitation and will thus be rendered capable of renewed firm adhesion to the electrodes. After the charging current has been cut off and the development of gases has stopped, the liquified portions of the gel in the vicinity of the electrodes will congeal again. The agitation of the gel and the consequent regeneration of an intimate contact between the stabilized electrolyte and the electrodes may be enhanced by so recharging the battery that gas bubbles will issue from the pores of the active material and will rise between the positive electrodes and the layers 37 thereby causing these layers to vibrate and to agitate the gel in immediate vicinity of the surface of the electrodes. As a result, the layers will liquify a substantial portion of the thixotropic hydrogel and will thus enable the electrolyte to re-generate the intimate contacting relationship to the electrodes, before the liquified hydrogel will congeal again. At any rate, however, the flow of charging current should be discontinued before the gas developed within the battery will raise the pressure within the housing to a degree sufficient to lift the relief valve. For that reason I prefer to use a suitable control circuit for the re-charging of the battery, such circuit having means responsive to the voltage of the battery and operative, when this voltage exceeds a certain limit, to cut off the charging current automatically.

Experience has shown that the lead or lead alloy of which the electrodes 10 and 11 and their projections 19, 20 and 26 are formed, should be free from antimony or other materials of electro-positive properties relative to lead, lest it may happen that the antimony will poison the negative electrodes, thereby decreasing the charging voltage and reducing the capacity progressively owing to the impossibility of fully re-charging the battery, before an excessive quantity of gases will be developed above a charging voltage of 2.4 v. per cell. Preferably, I use lead alloys including earth alkali metals, such as calcium. This makes it possible to continue the charging operation up to a voltage of between 2.45 and 2.65 v. per cell, preferably up to 2.5 v. per cell, whereby the battery may be fully loaded without risking an excessive development of gases. Another advantage of the use of lead or lead alloys free from antimony, preferably of alloys including an alkali earth metal, such as calcium, resides in an extremely low self-discharge of the battery and in an extraordinary shelf life without any substantial loss of capacity.

Owing to the use of such a re-charging method and owing to the consequent restriction of the volume of gases developed to a minimum just sufficient to re-generate the gel in immediate vicinity to the electrodes, no liquid electrolyte will collect above the plates 10 and 11, thus rendering means dispensable which would collect free electrolyte above the set of plates 10 and 11.

The porous layers 37 will act as wicks which absorb the liquified gel and distribute it uniformly over the surface of the electrodes, thereby promoting the passage of the current and the diffusion of the liquid electrolyte. Moreover, the layers 37 and the gel held thereby prevent passage therethrough of any gas bubbles produced in the charging operation, thus compelling such gas bubbles to rise between the electrodes and the layers 37. This prevents any oxygen produced on the positive electrodes 11 from contacting with the negative electrodes 10. In a similar manner the hydrogen produced at the negative electrodes 10 is prevented from flowing towards the positive electrodes. Another function of the layers 37 is to retain the active material within the positive electrodes 11, thereby increasing the lifetime of the battery and preventing the formation of current bridges or shortcircuits between the electrodes by active material collecting at the bottom of the battery. This is particularly important as it will insure constancy of the charging voltage during the entire lifetime of the battery which is important in view of the above described method of re-charging the battery.

As the sealing medium 32 increases the adhesion between the valve member 33 and the valve seat, the pressure required to lift the valve member 33 will be higher than the pressure exerted by the resilient retaining plate 34. In this manner the battery will be reliably sealed so that the electrolyte cannot vaporize and that no oxygen stemming from the atmosphere or other liquids or gases can enter the battery. The reliable seal of the battery has proved to contribute considerably to an extended lifetime of the battery by precluding oxidization of the negative electrodes 10 and a consequent self-discharge of the battery. Owing to the flat shape of the relief valve and owing to the small volume of the free space above the set of plates, any influence of the oxygen developed during the charging operation upon the negative plates 10 is restricted to a minimum.

Preferably, small quantities of an anti-oxidizing agent are added to the electrolyte and/or to the active material of the negative plates 10. This anti-oxidizing agent may be a monohydric, dihydric or plural hydric phenol or a polymer phenol. The quantity of this agent preferably amounts to between .05 and 1 percent by weight of the electrolyte, preferably, however, to .1%, no matter whether this quantity is admixed to the electrolyte or to the active material.

From the foregoing it will be seen that this invention is one well adapted to attain all of the ends and objects hereinabove set forth, together with other advantages which are obvious and which are inherent to the apparatus.

While the invention has been described in connection with a perferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Storage battery of lead-acid type comprising a housing, negative electrodes and positive electrodes spaced therefrom and surrounded by said housing, layers of porous fibrous material covering the opposed faces of said electrodes and being spaced from each other to confine pockets between each other, an acid electrolyte filling the space between said electrodes including said pockets and the pores of said layers, said electrolyte being formed by a thixotropic hydrogel constituting a colloidal solution of an additive in a diluted acid, said housing having a cover provided with an aperture and a spring-loaded pressure relief valve mounted on said cover to close said aperture but to open outwardly under the effect of excessive internal pressure within said housing said pressure relief valve including a cup-shaped valve body having a bottom forming an annular substantially horizontal valve seat, a valve member of inverted cup-shape mounted within said valve body and cooperating with said seat, a deformable hydrophobe sealing medium covering said valve seat in contact therewith, said valve member, when in closed condition, immersing into said medium, and a spring plate inserted in said cup-shaped valve body at the top thereof above said valve member, the periphery of said spring plate being secured to said valve body and the central portion of said spring plate engaging said valve member to urge same into contact with said bottom.

2. Storage battery as claimed in claim 1 in which said hydrophobe material is a silicon oil.

3. Storage battery as claimed in claim 1 in which a pole member connected with said positive electrodes extends outwardly through said cover, said battery further comprising a recessed protective annular member surrounding the outer projecting portion of said pole member and being carried by said cover.

4. Storage battery as claimed in claim 1 in which said valve body is insertable into said aperture from the outside and formed with bayonet locking means for securement to said cover.

5. Storage battery as claimed in claim 4 in which a welding seam connects said valve body to the edge of said aperture.

6. Storage battery as claimed in claim 1 in which bayonet recesses are provided in the edge of said aperture, said cup-shaped valve body having an external lower flange and an external upper flange, said lower flange being provided with bayonet sections insertable through said aperture into a position in which said lower flange underlies said cover and said upper flange overlies said cover, and a welding seam connecting said upper flange to said cover to secure said body against accidental rotation in said cover.

References Cited by the Examiner

UNITED STATES PATENTS

| | | |
|---|---|---|
| 1,756,072 | 4/1930 | Smith. |
| 1,999,870 | 4/1935 | Douglas _____ 136—163 |
| 2,088,543 | 7/1937 | Woodbridge. |
| 2,647,157 | 7/1953 | Booth _____ 136—147 |
| 2,707,202 | 4/1955 | Chubb _____ 136—147 |
| 3,067,275 | 12/1962 | Solomon _____ 136—157 X |
| 3,083,256 | 3/1963 | Slautterback _____ 136—177 |
| 3,172,782 | 3/1965 | Jache _____ 136—6 |

FOREIGN PATENTS 424,102 6/1934 Great Britain.

OTHER REFERENCES

Arthur et al.: The Condensed Chemical Dictionary, 6th edition, 1956, page 1019.

WINSTON A. DOUGLAS, *Primary Examiner.*

B. J. OHLENDORF, *Assistant Examiner.*